United States Patent [19]
Dilling et al.

[11] Patent Number: 5,755,830
[45] Date of Patent: *May 26, 1998

[54] METHOD OF PREPARING HIGH ACTIVITY SULFONATED LIGNIN DYE DISPERSANTS

[75] Inventors: Peter Dilling, Mt. Pleasant; Sallie B. Huguenin, Folly Beach, both of S.C.

[73] Assignee: Westvaco Corporation, New York, N.Y.

[*] Notice: The term of this patent shall not extend beyond the expiration date of Pat. No. 5,749,926.

[21] Appl. No.: 712,906

[22] Filed: Sep. 12, 1996

[51] Int. Cl.$^6$ .................... D06P 1/48; D06P 1/50
[52] U.S. Cl. .................. 8/524; 8/528; 8/557; 8/588; 8/561
[58] Field of Search ............. 8/524, 528, 552, 8/557, 561, 588, 650, 653, 908

[56] References Cited

U.S. PATENT DOCUMENTS

| | | | |
|---|---|---|---|
| 3,509,121 | 4/1970 | Benko | 260/124 |
| 3,864,276 | 2/1975 | Benko et al. | 252/354 |
| 4,151,207 | 4/1979 | Evju | 260/600 A |
| 4,534,771 | 8/1985 | Dilling | 8/524 |
| 4,629,469 | 12/1986 | Dilling | 8/557 |
| 4,740,590 | 4/1988 | Dilling | 530/500 |

*Primary Examiner*—Margaret Einsmann
*Attorney, Agent, or Firm*—Terry B. McDaniel; Daniel B. Reece, IV; Richard L. Schmalz

[57] ABSTRACT

Improved dyestuff compositions comprising a dye cake and a dye dispersant are disclosed wherein the dye dispersant comprises sulfonated or sulfomethylated lignin of increased activity and improved heat stability properties and which dispersants are disclosed to be prepared by substantial removal of the low molecular weight component of the sulfonated and sulfomethylated lignin. Exclusion of the low molecular weight portion of the dispersant may be accomplished by fractionation of the sulfonated or sulfomethylated lignin to remove a substantial portion of the molecules having a molecular weight below 3,000. Alternatively, in the case of lignin recovered from sulfate or soda wood pulping processes, the lignin may be fractionated to remove a substantial portion of the molecules having a molecular weight below 3,000 prior to sulfonation or sulfomethylation.

13 Claims, 6 Drawing Sheets

1

METHOD OF PREPARING HIGH ACTIVITY SULFONATED LIGNIN DYE DISPERSANTS

BACKGROUND OF THE INVENTION

1. Field of the Invention

This invention relates to new and improved sulfonated lignins useful as dye dispersants and to a process for improving the activity and heat stability properties of sulfonated lignins.

2. Description of the Related Art

Dyestuff compositions generally comprise a dye cake, i.e., of dyes and a dispersant and/or diluent. These dyestuff compositions are widely used to color both natural and synthetic fibers. In the dyestuff composition, the dispersant serves three basic functions: (1) it assists in reducing the dye particle to a fine size; (2) it maintains a dispersing medium; and (3) it is used as a diluent.

Dye dispersants are generally one of two major types: (1) sulfonated lignins from the wood pulping industry (via either the sulfite pulping process or the kraft pulping process) where lignocellulosic materials, such as wood, straw, corn stalks, bagasse, and the like, are processed to separate the cellulose or pulp from the lignin or (2) naphthalene sulfonates from the petroleum industry. The present invention relates to sulfonated lignin dye dispersants. Sulfite (or bisulfite) wood pulping process lignin is recovered from the spent pulping liquor, known as "black liquor," as lignosulfonates; whereas, kraft (or sulfate) wood pulping process lignin is recovered from the black liquor as the sodium salt of lignin (products marketed under the Indulin® mark by Westvaco Corporation).

This recovered lignin is subjected to sulfonation or sulfomethylation for use as dye dispersants (products marketed under the Polyfon®, Kraftsperse®, and Reax® marks by Westvaco Corporation). As used herein, the term "sulfonated lignins" may be used generally to refer to lignosulfonates, sulfonated lignins, or sulfomethylated lignins as before described.

The advantages of employing sulfonated lignins as dispersants in dyestuff compositions are (1) availability and (2) unique physical properties, which include good compatibility to many dye systems and outstanding dispersant characteristics at ambient and elevated temperatures. There are, however, a number of disadvantages in employing lignins as dispersants, whether they are sulfite lignins or kraft sulfonated lignins. These negative factors include fiber staining (as lignin in dry powder form is brown in color) and heat stability (as the dyeing process is conducted at elevated temperatures) of the lignins employed. These adverse properties are troublesome to dyers and many attempts have been made to overcome these disadvantages.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. U.S. Pat. No. 4,001,202 describes a process for preparing a sulfonated lignin with improved fiber staining properties useful as a dye dispersant by reacting lignin with an epihalohydrin. Also, U.S. Pat. No. 4,338,091 teaches reacting a modified lignin with sodium sulfite and an aldehyde; the lignin having been modified by a pretreatment with sodium dithionate.

Additional examples of reacting or modifying lignins to make them more suitable as dye dispersants include U.S. Pat. Nos. 4,184,845, 4,131,564, 3,156,520, 3,094,515, 3,726,850, 2,680,113, and 3,769,272. The art cited is meant to show the state of the art and is not intended to be all inclusive of lignin modifications.

Although the methods for treating and preparing sulfonated lignins described above offer some advantage during dyeing, none have produced a product possessing the improvements obtained by the improved products made according to the claimed process.

During the dyeing process, only the dye exhausts itself onto the fiber where it becomes an intimate part of the fiber. The lignin and other dyeing adjuvants, which are left in the exhaust liquor, need to be subsequently treated in primary and secondary waste treatment facilities. Although lignin is a natural material, lignosulfonates are considered relatively poorly biodegradable (albeit more biodegradable than synthetic dispersants from the petroleum industry), and they are often viewed as environmentally unfriendly as they often exceed the capacity of dye houses or municipality waste water treatment facilities.

One solution to this problem would be to increase the dye dispersant activity of lignin dispersants. (The term "activity" refers to the relative amount of dispersant required to function effectively. The less dispersant required to perform, the higher its activity; whereas the more dispersant required to perform, the lower is its activity.) Such enhanced activity would permit reduced dosages required for dyeing and thereby lessen the existing waste water treatment problems.

Therefore, it is the general object of this invention to provide sulfonated lignins of improved properties to enhance their usefulness as dye dispersants.

A particular object of this invention is to increase the activity of sulfonated lignin dispersants.

Another object of this invention is to provide a process for improving the heat stability of dye formulations including sulfonated lignins.

Other objects, features and advantages of this invention will be seen in the following detailed description of the invention.

SUMMARY OF THE INVENTION

It has been found that the activity of sulfonated and sulfomethylated lignins useful as dye dispersants in dyestuff compositions can be dramatically increased with improvements in the heat stability properties of the lignin by removal of at least a substantial portion of the low molecular weight component of the sulfonated and sulfomethylated lignin. Preferably, essentially all of the low molecular weight component of the sulfonated and/or sulfomethylated lignin is removed. Alternatively, similar improvement in dye dispersant properties can be achieved by removal of at least a substantial portion of the low molecular weight component of the lignin recovered from black liquor and subsequently sulfonating or sulfomethylating the higher average molecular weight lignin component. Preferably, essentially all of the low molecular weight component of the lignin is removed, followed by sulfonation and/or sulfomethylation of the remaining higher average weight lignin material.

DESCRIPTION OF THE PREFERRED EMBODIMENT(S)

Figure 1:
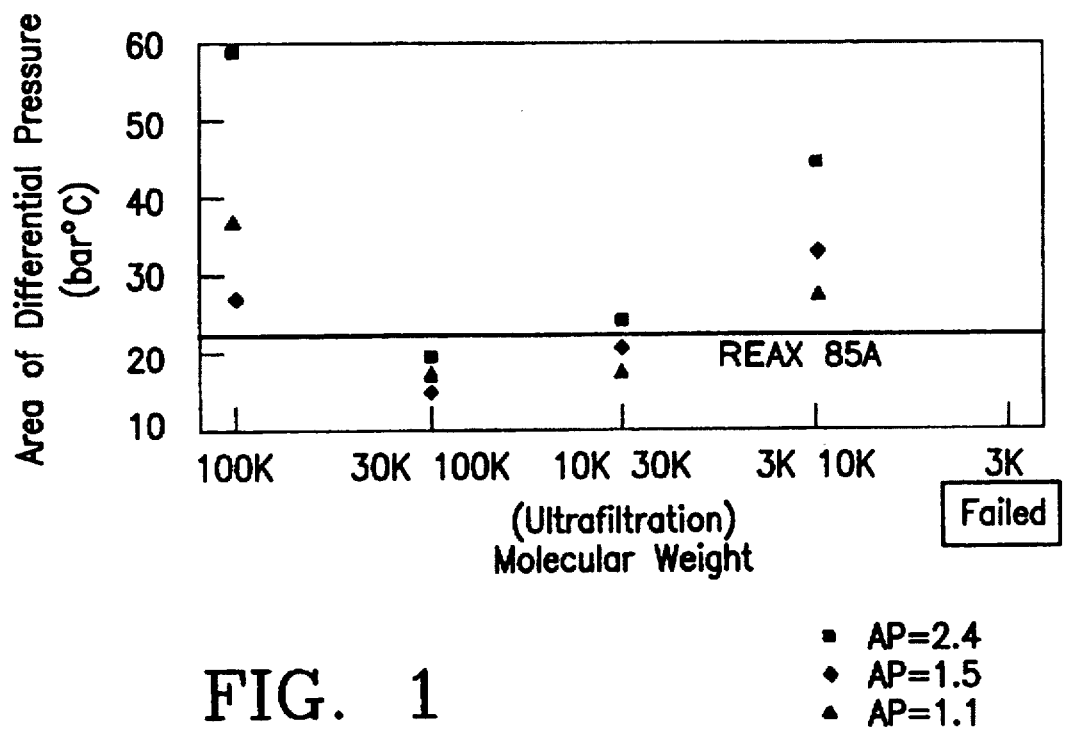
FIG. 1 is a graphic depiction of heat stability data comparing various molecular weight fractions of lignin which were subsequently sulfonated and used as dye dispersants for Disperse Orange 30 dyestuff.

Lignin is an amorphous phenyl propane polymer bound to the cell wall polysaccharides of most higher plants. Because of the random nature in which lignin is formed, the absolute three-dimensional structure of lignin is still unknown. Through degradation studies of lignin samples from a variety of plants, it has been shown that the lignin polymer consists mainly of coniferyl, coumaryl, and sinapyl alcohols which are polymerized by plant peroxidases in a free radical manner, and it is these free radical reactions which lead to its random structure.

Lignins recovered from any known wood pulping process may be employed in the process of this invention; preferably, however, they are obtained from the kraft wood pulping process wherein the natural lignin is present as a sodium salt. In kraft pulping, the wood is subjected to the effects of strong alkali which variably degrades the natural lignin to give a range of recoverable lignins of differing molecular weight. (See, for example, Table I in Example 1, below.) The lignins recovered in this process form soluble sodium salts which are separated from the cellulose and dissolved in the pulping liquor. The lignin is recovered from the spent pulping liquor, known as black liquor, by reducing black liquor pH to a point where the lignin salts are not soluble (~pH 9–10).

Reduction of the pH of the black liquor containing the lignin salt is easily accomplished by the introduction of acidic material, such as carbon dioxide. Upon the addition of acid to the black liquor and consequent pH reduction, the phenolate groups on the lignin molecule, which are in ionized form, are converted into their free phenolic or acidic form. This conversion renders the lignin insoluble in the black liquor as a result of which it precipitates out.

The alkali lignins, as recovered from black liquor by this precipitation procedure, are water insoluble products. Lignins obtained from the kraft, soda, or other alkaline processes to which this invention is directed, are not recovered as a sulfonated product, but may be subsequently sulfonated by reacting such material with a bisulfite or sulfite. A sulfonated lignin is any lignin containing at least an effective amount of sulfonate groups to give water solubility in moderately acidic and higher pH solutions. There always exists a significant low molecular weight fraction in recovered lignins whether the lignins are sulfite lignins recovered as lignosulfonates (see Table IV) or sulfate lignins (see Table I) which may be sulfonated and/or sulfomethylated (see Table II).

U.S. Pat. No. 4,551,151 to Dilling discloses that lignins with a molecular weight of about 5,000 or less affect the dye composition heat stability performance of any subsequently sulfonated lignin materials. Dilling teaches acidification of the alkaline black liquor containing the lignin salt at a pH where all but a negligible amount of the lignins having a molecular weight of about 5,000 or less do not precipitate out with the higher molecular weight lignin products, and, therefore, remain in solution with the black liquor.

One of the problems with the Dilling (U.S. Pat. No. 4,551,151) approach is that lignin isolation from black liquor via acid addition largely involves ionization of phenolate groups which, upon protonation, precipitate the lignin. As a result of the excessively high electrolyte concentrations which are generated during the acidification step, salting out also occurs. Because of their size, low molecular weight moieties ought to remain in solution longer than the higher molecular weight lignins, assuming the number of protonizing groups is equal. Based on pH tailoring and subsequent filtration, separation of the low molecular weight portion has the highest number of hydrophilic phenols, having acidity that varies with different neighboring functionalities. This alters the solubility-pH relationship a great deal, making impossible the separation of only low molecular weight lignins. In fact, maximization of removal of the low molecular weight fraction (<5,000) by the patented process invariably and inevitably involves removal of a significant portion of the medium molecular weight fraction. In addition to losing the positive contribution of this material to the desired dispersant properties, the separation process is very inefficient and, thus, suffers from poor economics.

In the present invention, there is no isolation of a particular lignin fraction in the black liquor, as taught by Dilling (U.S. '151). Moreover, the fractionations of the sulfonated and sulfomethylated lignins do not rely on pH control.

In contrast to ionization precipitation principles, the invention separation is based on molecular size separation alone. It will be clear from the examples to follow that low molecular weight removal from a variety of sulfonated sulfite lignins and sulfomethylated and sulfonated kraft lignins is occurring without interference of functional groups in the lignin; and, therefore, the invention process is a vast improvement in separation methods which, in turn, provides a greatly improved sulfonated lignin dispersant product. Not only does the invention process provide a generally improved, higher activity, dyestuff dispersant, it allows the dispersant manufacturer to tailor a particular dispersant for a particular dyestuff system.

Upon conventional lignin isolation and separation (i.e., acidification, coagulation, and filtration/decantation), the next step in developing a conventional lignin-based dye dispersant is to properly sulfonate the lignin. It should be noted that the degree of sulfonation of a lignin is proportional to the solubility of that lignin in an aqueous solution and the viscosity of such lignin. Therefore, a measurement of the solubility of a sulfonated lignin is one way to determine its degree of sulfonation.

One of the conventional processes for sulfonating a lignin involves the sulfomethylation of alkali lignin by reacting such lignin with sodium sulfite and formaldehyde. This process is mentioned by E. Adler et al. in U.S. Pat. No. 2,680,113. Sulfomethylation acts upon the aromatic nuclei of the lignin molecule in such a manner that —$CH_2SO_3H$ groups are bonded to such nuclei. Adler teaches that the treatment of the lignin with these sulfonation agents is carried out within a temperature range of 50° C. to 200° C., suitably 80° C. to 170° C., preferably 100° C. to 160° C. The quantity of sulfite used, calculated as anhydrous sodium sulfite, may vary from about 10% to 100% of the quantity of anhydrous lignin and the quantity of aldehyde is equivalent to the quantity of sulfite or lower, down to about 1%, calculated on the quantity of aldehyde is equivalent to quantity of sulfite or lower, down to about 1%, calculated on the quantity of the anhydrous lignin material. The treatment is preferably carried out in an alkaline solution.

The alkali lignin also may be subjected to sulfomethylation wherein the alkali lignin is mixed with water to form a slurry. To the slurry the sulfomethylation agents are added, i.e., sodium sulfite and formaldehyde. The ratio of sodium sulfite to formaldehyde ranges from about 1.1:0.1 to about 2.5:1.0, the preferred range being about 1.3:0.8. It has been found that the addition of excess amounts of sodium sulfite as compared to formaldehyde yields a sulfonated lignin product with reduced molecular weight.

When formaldehyde and sodium sulfite are combined in stoichiometric amounts, they form, almost instantaneously a hydroxy methane sulfonate, which in turn undergoes reaction with the lignin to form sulfonated lignin derivatives. The hydroxy methane sulfonate intermediate exists to only 90% in the desired form, while 10% of the reactants are present at all times. A problem with having 10% of the reactants present is that formaldehyde undergoes coupling reactions with the lignin being sulfomethylated. It would, therefore, be advantageous to have as small an amount of unreacted formaldehyde in the reaction mixture as possible. This can be accomplished by varying the mole ratio of sodium sulfite to formaldehyde. Increasing the mole ratio of sodium sulfite to formaldehyde results in the generation of a greater amount of hydroxy methane sulfonate intermediate at the expense of remaining amounts of unreacted formaldehyde. The increased quantities of sodium sulfite result in a lower degree of polymerization and, consequentially, a sulfonated lignin with a lower molecular weight.

In a further sulfonation method, the precipitated lignin is subjected to an acid washing procedure, preferably with sulfuric acid, and is dried to produce a lignin material having a pH ranging from about 1.5 to about 5.0. When the lignin is combined with water to form a slurry of about 25% solids, the lignin exists at this pH range in precipitated form. If the lignin slurry pH is below 5, the pH is raised to about 5.0 through the use of sodium hydroxide. At this point, sodium sulfite is added to raise the initial pH of the reaction mixture to a range of about 7.0 to 7.5.

Sulfonation occurs with the addition of formaldehyde which raises the pH of the slurry to a range of about 8.0 to about 9.2. The slurry is then taken to a temperature ranging from about 130° C. to about 175° C., the preferable temperature being about 140° C. The temperature is maintained for a period of time ranging from about 30 minutes to 12 hours, the most preferable being about 2 hours.

The use of low pH and low temperature has two advantages. For one thing, the lignin is less likely to decompose at these conditions than under the normal reaction conditions. The fact that the sulfonation occurs at a low pH means that the resulting sulfonated lignin product will possess a pH lower than would otherwise be obtainable.

When sulfonated lignins are employed as dye dispersants, it is preferred that the pH of such lignin range from about 4 to about 8. If a lignin is sulfonated at a high pH, the resulting sulfonated lignin will have a high pH. In order for a presscake formulator to use such sulfonated lignin as a dispersant, the dyer is required to add an acid to such lignin to lower the pH which translates into additional expense. By sulfonating the lignin at a low pH, a sulfonated lignin is obtained which requires the use of less or no acid to render it suitable as a dye dispersant.

It is all of the above sulfonated and sulfomethylated lignins, as well as other prior art sulfonated lignins of the sulfite or alkaline pulping processes to which the present invention method is directed. Improved sulfonated or sulfomethylated lignin dyestuff dispersants are provided by essential elimination of that fraction of the sulfonated or sulfomethylated lignins exhibiting a molecular weight below 3,000, preferably below 10,000. Inasmuch as sulfonation or sulfomethylation increases the lignin's molecular weight an insignificant amount, in the case of lignin recovered from sulfate, soda, or other alkaline pulping processes the improved lignin dispersants of the invention may also be provided by fractionating the recovered lignin to remove a substantial portion of the molecules having a molecular weight below 3,000 (preferably below 10,000) and then subsequently sulfonating and/or sulfomethylating the remaining higher molecular weight lignin fraction. While an absence of this low molecular weight fraction necessarily raises the average molecular weight of the lignin dispersant, the invention composition is not defined by a particular range of average molecular weight, because an increase in average molecular weight can result from other than an absence of this low molecular weight fraction.

The method or means of elimination (or, at least, substantial elimination) of this low molecular weight fraction is not critical. The subject matter of this invention relates only to improved sulfonated lignin dye dispersants which are essentially free of this low molecular weight fraction. Because there are multiple methods of determining molecular weight which may give different results, the invention relates to the improved sulfonated (or sulfomethylated) lignin dye dispersant characterized by the substantial absence of molecules below a molecular weight of 3,000 (or, preferably, characterized by the substantial absence of molecules below a molecular weight of 10,000), as determined by ultrafiltration. Specifically, ultrafiltration employed in the work described herein is ultrafiltration through a 3,000 molecular weight membrane (or, most preferably, a 10,000 molecular weight membrane) in an Amicon (or similar) ultrafiltration unit. The presence of sulfonated lignin dye dispersant in the low molecular weight fraction provided by ultrafiltration is determined by gel permeation chromatography (GPC), as described in Example 1. An apparatus employing disc membranes is suitable for laboratory scale; whereas, an apparatus employing spiral membranes permits higher throughput and is preferred for larger scale processing.

One alternative means of removing, or substantially eliminating, the low molecular weight fraction of lignin/sulfonated lignin for combination with a dye to result in the improved dyestuff composition of the invention may involve a reverse osmosis process. Another alternative means of substantial reduction of the low molecular weight fraction of the lignin/sulfonated lignin may involve crosslinking the low molecular weight fraction of either (a) the lignin material, followed by sulfonation and/or sulfomethylation or (b) the sulfonated and/or sulfomethylated lignin. Also, by reducing the size of low molecular weight fraction by pre-crosslinking, product loss in the subsequent fractionation may be minimized.

The sulfonated lignins prepared in accordance with the present invention can be employed as dispersants in dyestuff compositions. The amount of such dispersant required will vary depending upon the particular dye cake, the material to be dyed and the effect desired. The most important factor in determining the proper amount of dispersant composition to be used in making up the dyestuff is the particular dye cake used. Generally, this amount will vary from dye to dye.

The following are examples only and should not be construed as limiting the invention.

EXAMPLE 1

In order to identify the structure-property-performance relationships of lignin in dyestuff related applications, lignin recovered by low pH precipitation from kraft wood pulping process black liquor (Indulin® A) was separated into five molecular weight fractions by ultrafiltration. The fractionation was performed on an Amicon RA2000 ultrafiltration unit using Amicon spiral membranes. The pH was adjusted to 11 with 50% NaOH, and the solids were adjusted to 10%. The Indulin was filtered through 100K, 30K, 10K, and 3K membranes, respectively. Each fraction was washed until the outflow was clear. The molecular weight data of the fractions, determined by gel permeation chromatography (GPC), are shown in Table I.

TABLE I

| Indulin ® Fraction | Mn[1] | Mw[2] | Mz[3] | Yield % |
|---|---|---|---|---|
| >100K | 600 | 25900 | 48000 | 18 |
| >30K<100K | 180 | 6300 | 13400 | 18 |
| >10K<30K | 130 | 4000 | 9000 | 33 |
| >3<10K | 80 | 1900 | 4500 | 11 |
| <3K | 40 | 1200 | 3100 | 20 |

[1]Mean molecular weight
[2]Average molecular weight
[3]Highest molecular weight The average molecular weights of the fractions represented in Table I were determined by preparing the lignin samples at a concentration of 1 mg/ml, based on % wt/wt solids in aqueous mobile phase (20:80 mixture acetonitrile to 0.1N sodium nitrate, pH 11.0). The lignin samples were allowed to equilibrate for at least eight hours and filtered through 0.45 micron filters prior to analysis. An aliquot of 100 μl was injected onto four Waters® Ultrahydragel columns (1000, 500, 250, and 120 Å) equilibrated to 40° C. Peaks were detected with a Waters® Model 486 ultraviolet detector (UV 486) set to 280 NM. Polystyrene sulfonate narrow standards were used to create a calibration curve. The curve fit was first order with a forced origin.

The different fractions were each sulfonated to three different degrees for acid points of 1.1, 1.5, and 2.4 grams. As earlier noted, solubility measurements effectively measure degree of sulfonation. Therefore, degree of sulfonation is measured in terms of the amount (in grams) of 10N sulfuric acid required to initiate precipitation of lignin (0.175 g, based on solids, and diluted to 35 g with distilled water) out of solution. The <3K fraction did not sulfonate, probably due to less side chain reaction sites, but this fraction did sulfomethylate to an acid point of 1.5. There was no significant change in the molecular weight once the fractions were sulfonated.

Figure 2:
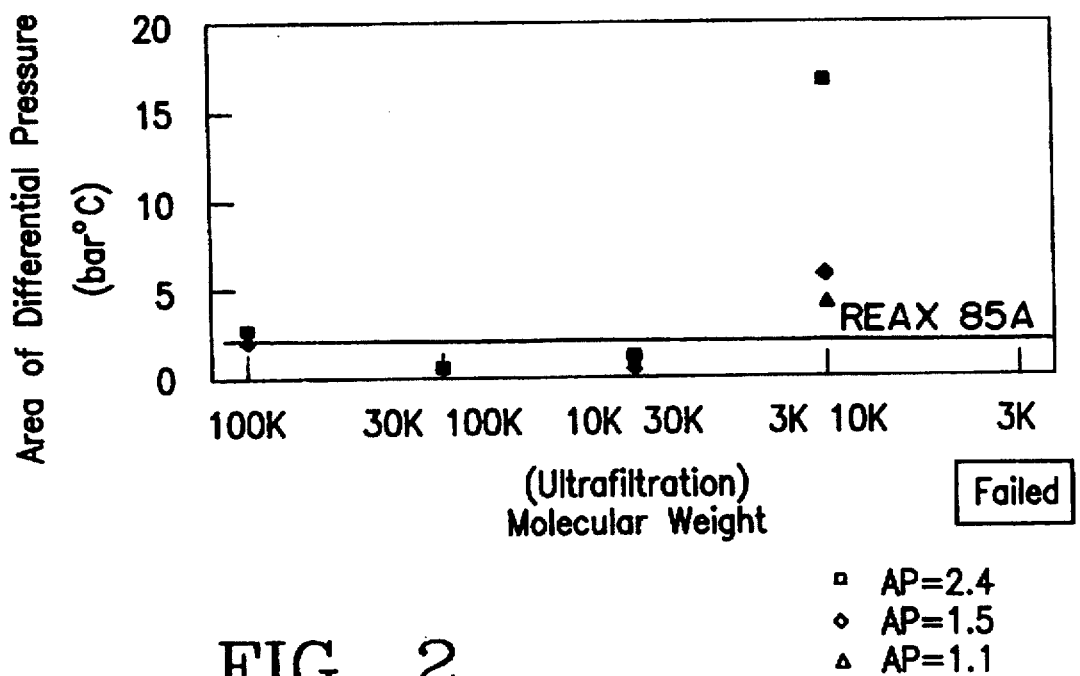
FIG. 2 is a graphic depiction of heat stability data comparing various molecular weight fractions of lignin which were subsequently sulfonated and used as dye dispersants for Disperse Red 167:1 dyestuff.

The heat stability of the different sulfonated fractions were tested by package dyeing (with a Zeltex package-dyeing unit from Werner Mathis, i.e., 1 L/min., 70° C.–130° C.,@2° C./min., and chamber pressure of 2 bars) using a hydrophobic dye (Disperse Red 167:1) and a hydrophilic dye (Disperse Orange 30). The results of this testing are graphically depicted in FIGS. 1 and 2, in comparison with the results for Reax® 85A (a conventional sulfonated lignin dye dispersant regarded by the industry to exhibit high heat stability).

The >10K<30K and >30K<100K fractions had the highest heat stability and were equal to or better than the standard, Reax® 85A, with both dyes tested. The solubility of these two fractions had no effect on the heat stability.

The >100K and >3K<10K fractions were equal to or lower than Reax® 85A in heat stability, depending on the solubility. With Disperse Orange 30, the heat stability of the >100K fraction sharply deteriorated with increased solubility. This did not occur with the more hydrophilic dye, Disperse Red 167:1, where the heat stability was equal to Reax® 85A for all degrees of sulfonation. With the >3K<10K fraction, the heat stability decreased with increasing solubility with both dyes tested, but this trend was more definite with Disperse Red 167:1. The lowest molecular weight fraction, <3K, failed the test at 70° C. with both dyes.

Figure 3:
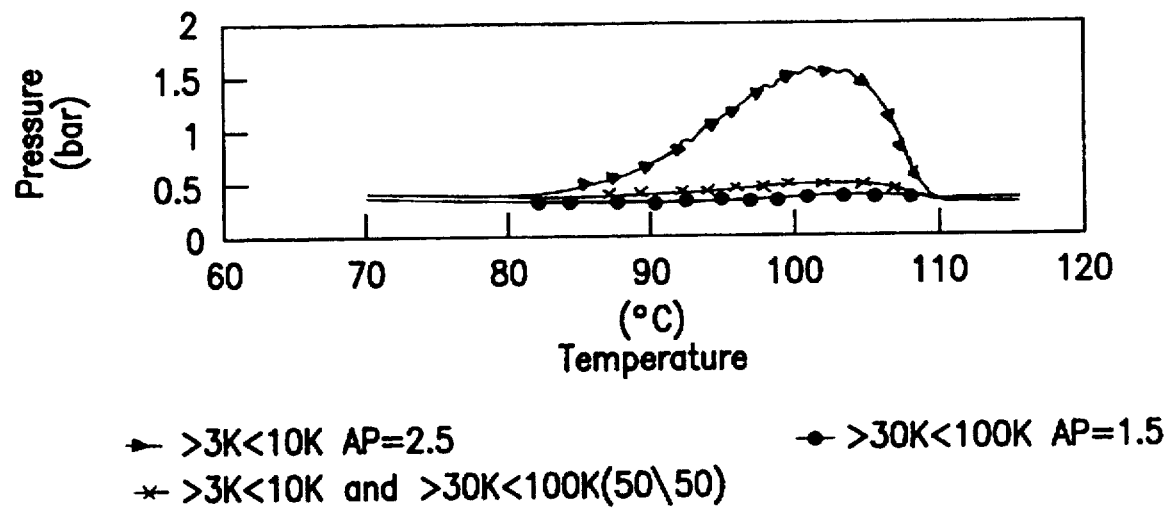
FIG. 3 is a graphic depiction of heat stability data for comparing relative dye dispersant activities of two sulfonated molecular weight fractions of lignin and their combination, using Disperse Red 167:1 dyestuff.
Figure 4:
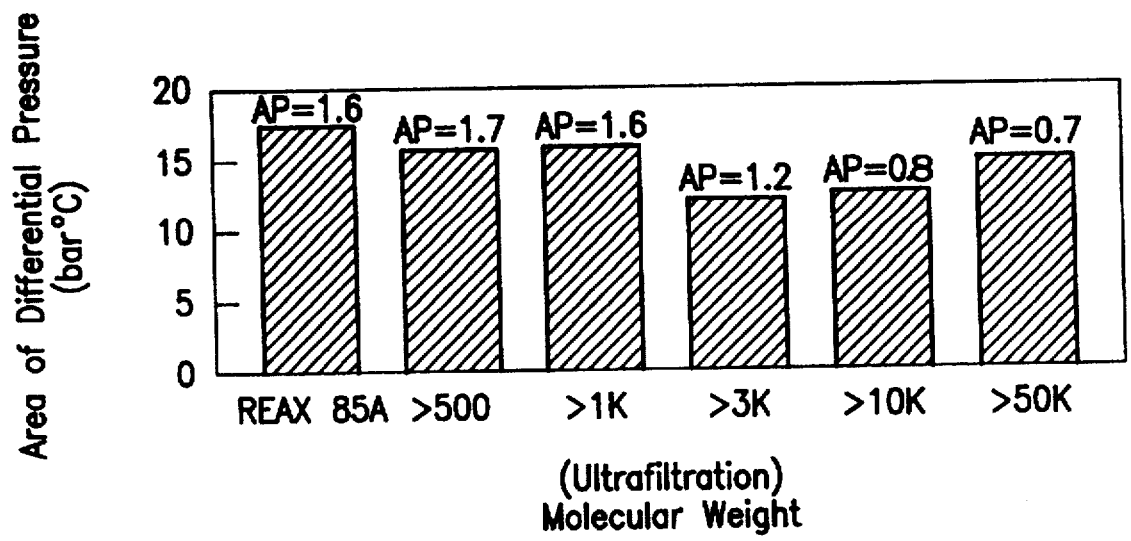
FIG. 4 is a bar graph depiction of heat stability data for comparing relative molecular weight fractions of sulfonated lignin dye dispersants and a commercial sulfonated lignin dye dispersant, using Disperse Orange 30 dyestuff.
Figure 5:
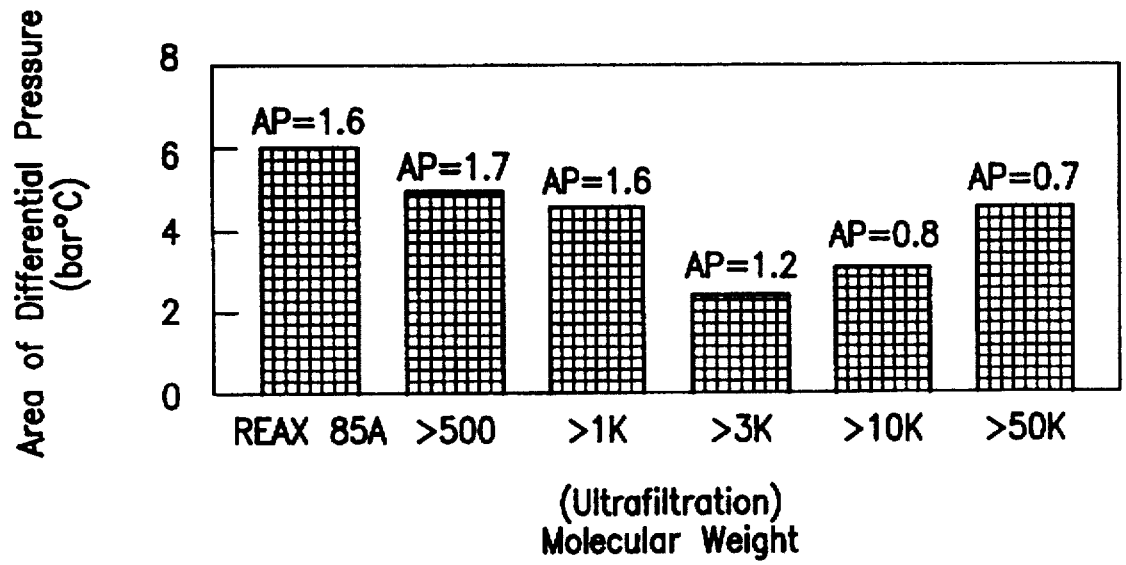
FIG. 5 is a bar graph depiction of heat stability data for comparing relative molecular weight fractions of sulfonated lignin dye dispersants and a commercial sulfonated lignin dye dispersant, using Disperse Red 167:1 dyestuff.
Figure 6:
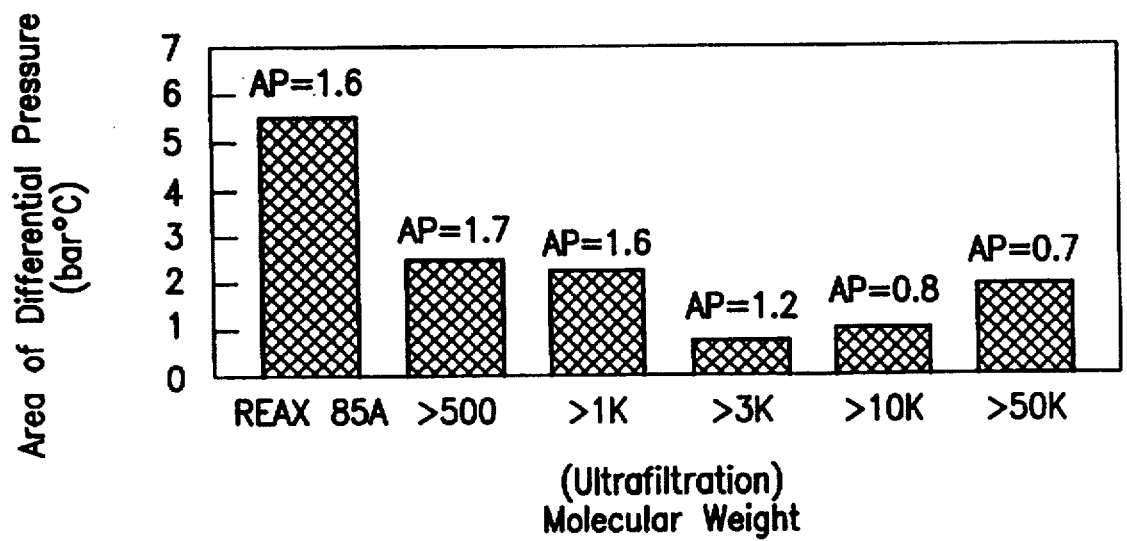
FIG. 6 is a bar graph depiction of heat stability data for comparing relative molecular weight fractions of sulfonated lignin dye dispersants and a commercial sulfonated lignin dye dispersant, using Disperse Blue 79:1 dyestuff.
Figure 7:
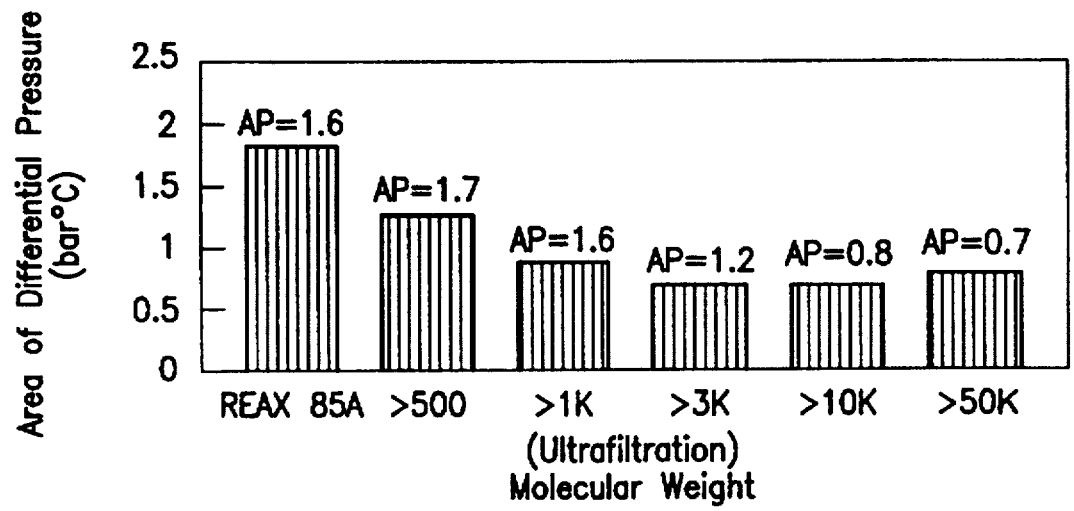
FIG. 7 is a bar graph depiction of heat stability data for comparing relative molecular weight fractions of sulfonated lignin dye dispersants and a commercial sulfonated lignin dye dispersant, using Disperse Blue 60 dyestuff.

Also it is interesting to note in FIG. 3 how well a 50/50 loading of the >30K<100K and >3K<10K fractions performed. It can be concluded from these test results that the activity of the high molecular weight lignin is much higher than previously appreciated, and the low molecular weight fraction does not participate in the dyeing process.

EXAMPLE 2

This example addresses the relationship of various molecular weight fractions of Reax® 85A and the lignin's heat stability in dye dispersant applications with four dyestuffs with different hydrophilic and hydrophobic character (Disperse Orange 30, Disperse Blue 79:1, Disperse Red 167:1, and Disperse Blue 60). Reax® 85A is a sodium sulfonated lignin prepared by sulfomethylating a kraft wood pulping recovered lignin and marketed worldwide as a dye dispersant by Westvaco Corporation. Varying amounts of Reax® 85A were removed successively in an Amicon ultrafiltration chamber using 50K, 10K, 3K, 1K, and 500 molecular weight disc membranes under 60 psi of nitrogen. The percent of low molecular weight material removed and the sulfonation of the remaining fraction is shown in Table II.

TABLE II

| Amicon Membrane | Acid Point (g) | Material Removed (%) |
| --- | --- | --- |
| 500 | 1.7 | 9.0 |
| 1K | 1.6 | 12.8 |
| 3K | 1.2 | 30.0 |
| 10K | 0.8 | 38.9 |
| 50K | 0.7 | 47.1 |

Heat stability measurements of the dye dispersant performance of the various Reax® 85 A fractions were conducted on a package dyeing instrument from Werner Mathis at one liter/minute flow rate over a temperature range of from 70° C. to 130° C., increased at 2° C./min. with a chamber pressure of 2 bars, and compared with heat stability performances of unfractionated Reax® 85A. The results of such comparisons are graphically depicted in FIGS. 4–7.

FIGS. 4–7 indicate that the best high temperature stability with the four different dyestuffs was obtained when the molecular weight fractions below 3000 were removed from the Reax® 85A. The area of differential pressure (y-axis) indicates the heat stability; and the greater the area, the worse the heat stability. Table 2 shows that in the fractionation process, 30% of the low molecular lignin and inorganic salts are removed. FIGS. 4–7 also indicate that there is a limit as to how much lignin can be removed before the heat stability improvements begin to degrade.

Figure 8:
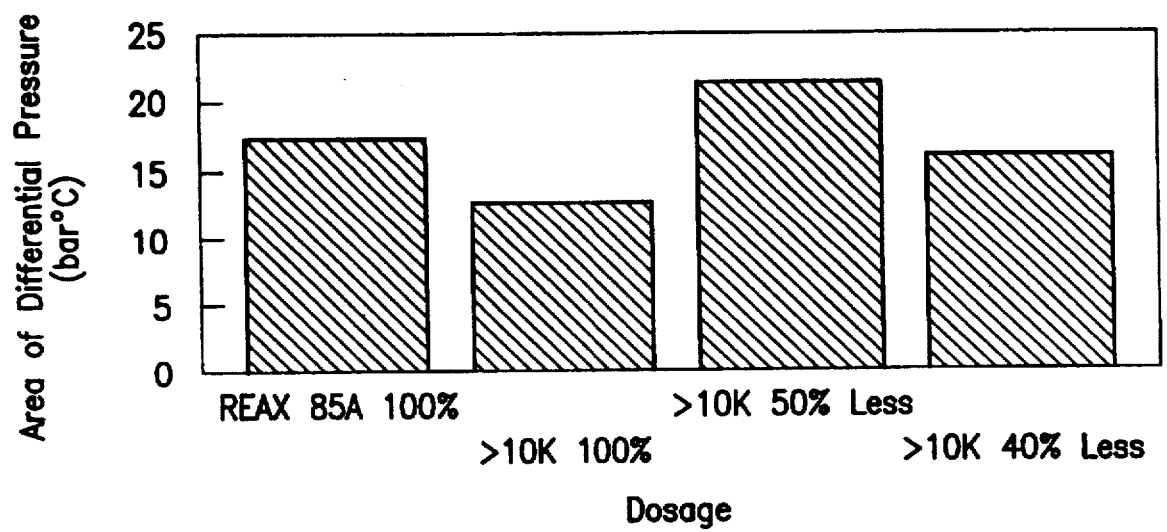
FIG. 8 is a bar graph depiction of heat stability data at varying dosages of specific molecular weight fractions of sulfonated lignin dye dispersant as compared to commercial (unfractionated) sulfonated lignin dye dispersant, using Disperse Orange 30 dyestuff.

FIG. 8 shows that the dosage of the high molecular weight fraction with Disperse Orange 30 can be reduced between 40% and 45% and still equal the heat stability of commercial, unfractionated Reax® 85A. The dosage study with Disperse Orange 30 was conducted with both the >3K and >10K fractions and, although not included in FIG. 8, the results for both fractions were the same.

Figure 9:
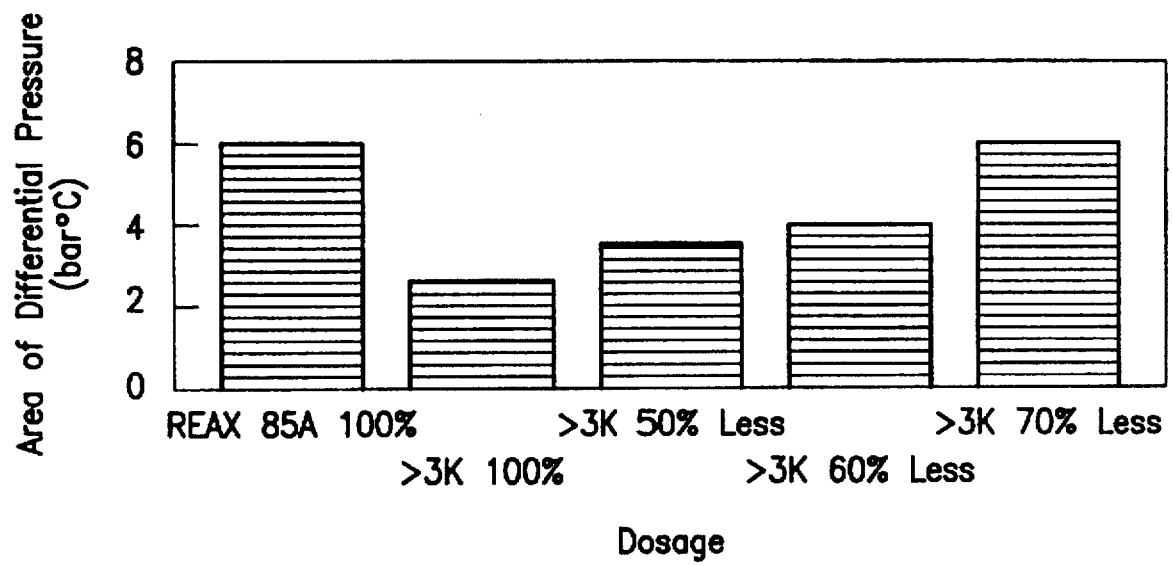
FIG. 9 is a bar graph depiction of heat stability data at varying dosages of specific molecular weight fractions of sulfonated lignin dye dispersant as compared to commercial (unfractionated) sulfonated lignin dye dispersant, using Disperse Red 167:1 dyestuff.
Figure 10:
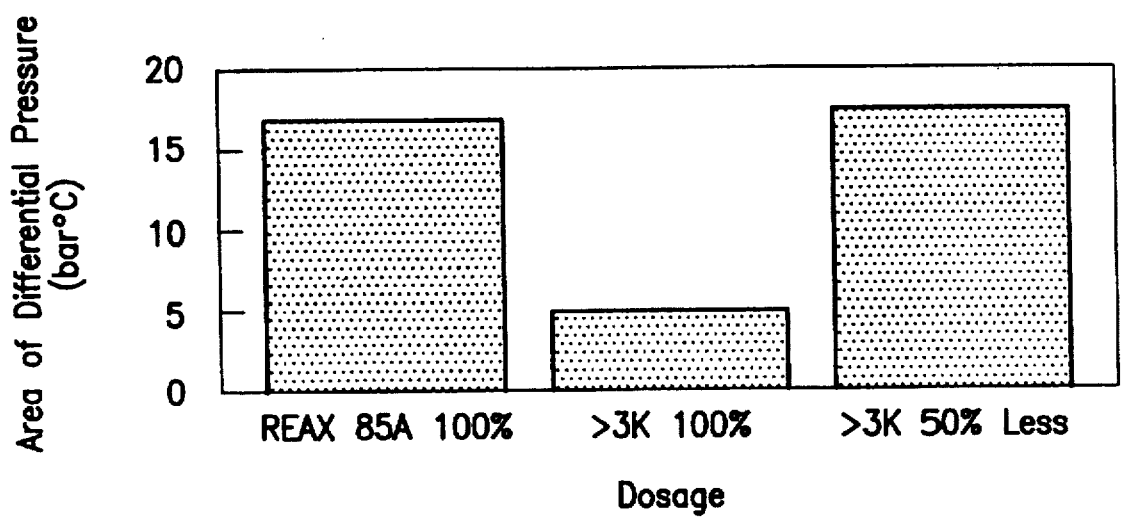
FIG. 10 is a bar graph depiction of heat stability data at varying dosages of specific molecular weight fractions of sulfonated lignin dye dispersant as compared to commercial (unfractionated) sulfonated lignin dye dispersant, using Disperse Blue 79:1 dyestuff.
Figure 11:
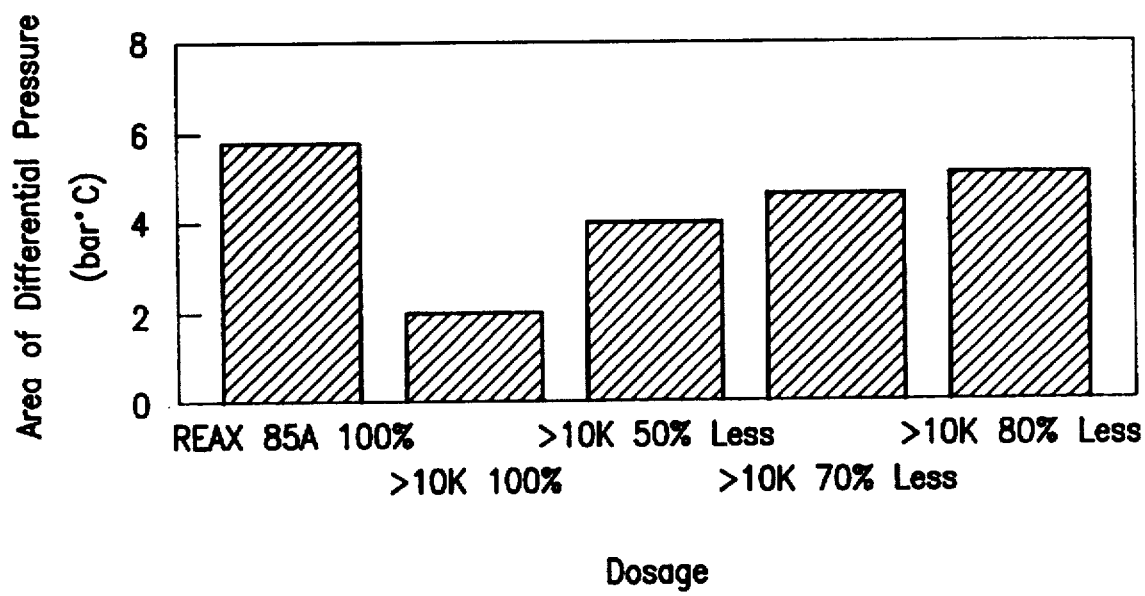
FIG. 11 is a bar graph depiction of heat stability data at varying dosages of specific molecular weight fractions of sulfonated lignin dye dispersant as compared to commercial (unfractionated) sulfonated lignin dye dispersant, using Disperse Blue 60 dyestuff.

The same trend is seen with Disperse Red 167:1, Disperse Blue 79:1, and Disperse Blue 60 (FIGS. 9–11, respectively), except that the dosage with these dyes could be reduced significantly more to 70%, 50%, and 80%, respectively. (Disperse Red 167:1 and Disperse Blue 79:1 are hydrophobic dyestuffs; whereas, Disperse Blue 60 is more hydrophilic in nature.) The lower dispersant dosage benefits the relatively poor biodegradability of lignins in that smaller amounts of it need to be treated in primary and secondary waste water treatment facilities upon completion of the dyeing process.

EXAMPLE 3

To determine improvements in dyestuff color strengths provided by the invention lignin dye dispersant composition, commercial Reax® 85A and Reax® 85A which had been fractionated by ultrafiltration to remove the molecular weight fraction below 3,000 were subjected to a heat stability boiling test to compare their relative color strengths in relation to current industry standards. The heat stability boiling test employed involves dispersing 1 g. dyestuff (100% basis) in 200 mls. distilled water. The pH is adjusted to 4.5 with dilute acetic acid. The dispersion is next heated to 100° C. (boiling) and held at 100° C. for 15 minutes. The heated dispersion is filtered through a preweighed 11 cm Whatman #2 filter paper placed on top of a Whatman #4 filter paper under 22 inches vacuum. The evaluation is based on the residue on the #2 filter paper.

The results are shown in Table III.

TABLE III

| Dyestuff Type | Color Strength of Standard Reax ® 85A (%) | Color Strength of High MW Reax 85A (%) |
| --- | --- | --- |
| Disperse Orange 30 | 100 | 175 |
| Disperse Blue 79:1 | 200 | 275 |
| Disperse Red 167:1 | 100 | 200 |
| Disperse Blue 60 | 200 | 300 |
| Disperse Red 60 | 200 | 264 |

When boiling test heat stability was compared at increased color strengths (over current industry standards), all standard Reax® 85A formulations failed and all high molecular weight Reax® 85A formulations passed the heat stability test at the higher color strength.

EXAMPLE 4

This example is provided to show the improvements in dyestuff composition heat stability achieved using sulfite pulping black liquor derived lignosulfonate dispersants from which the low molecular weight fraction has been removed. All samples tested are commercial dye dispersants manufactured by Borregaard. The molecular weight portion of each sample was removed by ultrafiltration as in the previous examples, using a 3,000 molecular weight membrane. The measurements made are shown in Table IV, below. The molecular weight measurements are "average" molecular weights; the acid points were determined with 10N $H_2SO_4$; and the final column shows the percentage dosage reduction permitted to achieve the same or similar heat stability.

TABLE IV

| Sample (precursor) | Yield (%) | Removed (%) | MW precursor | MW > 3K | AP precursor | AP > 3K | Heat Stability precursor (bar °C.) | Heat Stability > 3K (bar °C.) | Heat Stability > 3K (bar °C.) |
| --- | --- | --- | --- | --- | --- | --- | --- | --- | --- |
| Ufoxane-RG | 49.1 | 50.9 | 11,100 | 13,600 | 10.1 | 5.2 | 58.5 | 49.9 | 56.4 (25% less) |
| Dynasperse B | 38.4 | 61.6 | 8,600 | 12,200 | 8.7 | 5.9 | 69.1 | 34.9 | 60.0 (75% less) |
| Vanisperse CB | 52.1 | 47.9 | 3,200 | 4,200 | 2.0 | 1.4 | 24.4 | 16.4 | 16.6 (30% less) |

Even though removal of the low molecular weight fraction left from 38.4% to 52.1% of the sulfite pulping derived sulfonated lignin, heat stability of the dyestuff composition was improved at the same dosage level. Surprisingly, even reduced dosages of from 25% to 70% less than the standard dosage of precursor lignin material resulted in improved heat stability values for the dyestuff compositions.

While it has been suspected that the inorganic salts and very low molecular weight lignin fraction in lignin dye dispersants did not participate or contribute to the desirable dye dispersant properties, it is surprising and unexpected that, for example, removal of as little as 20% of the lignin dispersant material (which 20% is primarily represented by the low molecular weight fraction, i.e., <3K, preferably <10K) could result in product improvements to permit achievement of improved dyestuff heat stability (over the unfractionated lignin dye dispersant) with a substantially reduced dosage in the dyecake. This discovery leads to the following possibilities:

1. The lower dosage would be beneficial from an environmental standpoint in that lower amounts of dispersant would enter into the waste water treatment process, making the lignin more environmentally friendly; and 2. The lower dispersant dosage would permit higher color strength dyestuff formulations beyond the existing standards. This may be particularly beneficial in liquid formulations where the lowered quantity of lignin could be substituted with dyestuff, thereby increasing the color value of the formulation. The net effect is a more efficient package which would improve product throughput and shipping cost for the dyestuff manufacturer and inventory for the textile house.

While the invention has been described and illustrated herein by references to various specific materials, procedures, and examples, it is understood that the invention is not restricted to the particular materials, combinations of materials, and procedures selected for that purpose. Numerous variations of such details can be employed, as will be appreciated by those skilled in the art.

What is claimed is:

1. A method for preparing an improved dyestuff composition comprising combining a dye cake and a lignin dispersant, wherein the improvement comprises subjecting the lignin dispersant to a treatment for removing the portion thereof which has a molecular weight of less than 3,000 prior to combining with the dye cake.

2. The method of claim 1 wherein the lignin is lignosulfonate recovered from black liquor from a sulfite wood pulping process.

3. The method of claim 1 wherein the lignin is a lignin recovered from black liquor from an alkaline wood pulping process, which is subsequently reacted with sodium sulfite and formaldehyde.

4. The method of claim 3 wherein the alkaline wood pulping process is selected from the group consisting of kraft and soda wood pulping processes.

5. The method of claim 1 wherein the dye cake is selected from the group consisting of disperse dyes and vat dyes and wherein the lignin dispersant is selected from the group of sulfonated lignin and sulfomethylated lignin.

6. The method of claim 1 wherein the treatment for removing the portion of the lignin dispersant which has a molecular weight of less than 3,000 is fractionation of the lignin dispersant according to its molecular weight to separate the portion of the dispersant having a molecular weight of less than 3,000 from the remaining portion of the dispersant.

7. The method of claim 6 wherein the fractionation is performed by ultrafiltration of the lignin dispersant through a membrane designed to remove the molecular weight fraction thereof below 3,000.

8. The method of claim 1 wherein the improvement comprises subjecting the lignin dispersant to a treatment for removing the portion thereof which has a molecular weight of less than 10,000 prior to combining with the dye cake.

9. The method of claim 6 wherein the fractionation is performed by ultrafiltration of the lignin dispersant through a membrane designed to remove the molecular weight fraction thereof below 10,000.

10. The method of claim 6 wherein the fractionation is performed by reverse osmosis of the lignin dispersant for removal of the molecular weight fraction which has a molecular weight of less than 3,000.

11. The method of claim 10 wherein the fractionation is performed by reverse osmosis of the lignin dispersant for removal of the molecular weight fraction which has a molecular weight of less than 10,000.

12. The method of claim 6 wherein the fractionation is preceded by crosslinking the portion of the lignin dispersant which has a molecular weight of less than 3,000.

13. The method of claim 12 wherein the fractionation is preceded by crosslinking the portion of the lignin dispersant which has a molecular weight of less than 10,000.

* * * * *